United States Patent [19]
Inuiya

[11] 3,885,096
[45] May 20, 1975

[54] OPTICAL DISPLAY DEVICE
[75] Inventor: Masafumi Inuiya, Asaka, Japan
[73] Assignee: Fuji Photo Film Co., Ltd., Kanagawa, Japan
[22] Filed: July 13, 1973
[21] Appl. No.: 378,861

[30] Foreign Application Priority Data
July 15, 1972  Japan.............................. 47-70942

[52] U.S. Cl..... 178/15; 340/146.3 SY; 340/324 AD
[51] Int. Cl. ............................................ G08b 5/00
[58] Field of Search ............ 178/15, 18, 19, 20, 30; 340/324 A, 324 AD, 146.3 SY; 346/139 C

[56] References Cited
UNITED STATES PATENTS
3,242,470  3/1966  Hagelbarger et al......... 340/324 AD
3,292,489  12/1966  Johnson et al............... 340/324 AD
3,761,877  9/1973  Fernald....................... 340/146.3 SY Primary Examiner—Thomas A. Robinson
Attorney, Agent, or Firm—Sughrue, Rothwell, Mion, Zinn & Macpeak

[57] ABSTRACT

An optical display device comprising a screen for optically displaying an image record, means for making a light spot impinge on the screen at a desired position on the image record, means for photoelectrically detecting the position of the light spot to produce a control signal corresponding to the position, and an information retrieval device in which information stored therein is outputted under the control of the control signal.

12 Claims, 8 Drawing Figures

OPTICAL DISPLAY DEVICE

BACKGROUND OF THE INVENTION

1. Field of the Invention

This invention relates to an optical display device, and more particularly to an optical display device which displays an optical image on a projection screen where a part of the image projected on the screen can be converted into an electric signal if this part of the image is pointed to with a light pen or the like.

In general, an optical display device or an optical projection device is an enlarging projector which renders an image carried on a microfilm or other type of film visible to the naked eye or enlarges a small part of an object which is to be observed visually by use of an optical system.

The optical display device of this invention is a device which has, in addition to the above features, the capability to convert a part of the image projected on the screen to an electric signal to be put into a computer by pointing to that part of the image with a light pen or the like. An optical display device of this type can be effectively used in a computer system as an interface of the image man-machine system.

2. Description of the Prior Art

As an interface of the above-described type of man-machine system which has hitherto been used, the CRT graphic display is well known. In a CRT graphic display, the information displayed on the CRT is directly put into a computer by the use of a light pen. However, this type of conventional graphic display is necessarily very expensive because all of the images to be displayed are required to be stored therein. Further, it has been almost impossible to display a complicated image including half tones due to limitations in the capacity of memories and the resolving power of a CRT. For instance, while it only costs about 10–20 cents to store one image of A4 size having half tones on a photographic film such as a microfilm (even including the retrieval device therefor), it costs as much as about $400 to about $4,000 for storage cost when a magnetic drum, disc, tape etc., is used as a memory for the computer.

However, it has been impossible to directly put information into a computer from the image projected on the projection screen of an optical projection device such as a microfilm reader, and accordingly, the operator has had to read the information in the image with his eyes and put the information into the computer by the use of a key board. On the basis of the above disposition, optical projecting devices have been inferior to computer graphic displays when used as an interface in a man-machine system.

SUMMARY OF THE INVENTION

In light of the above-mentioned defects inherent in conventional systems, the primary object of the present invention is to provide an optical projection device or a display device in which the image projected on the optical projection screen can be converted into an electric signal to be put into a computer.

Another specific object of the present invention is to provide an optical projection device in which a part of the image projected on the screen thereof is converted into an electric signal and put into a computer as an input when the part of the image is pointed to with a light pen which emits a light spot.

Still another object of the present invention is to provide an optical display device which can be used in a man-machine computer system wherein optical information is converted into an electric signal to be put into the computer.

The optical projection or display device in accordance with the present invention is provided with a photoelectrical spot detecting means on the back of the projection screen to convert the part of the image projected on the screen and pointed to by a light pen into an electric input signal representing the information of the image.

Other objects, features and advantages of the present invention will be made apparent from the following description thereof taken in conjunction with the accompanying drawing.

DETAILED DESCRIPTION OF PREFERRED EMBODIMENTS OF THE INVENTION

Figure 1:
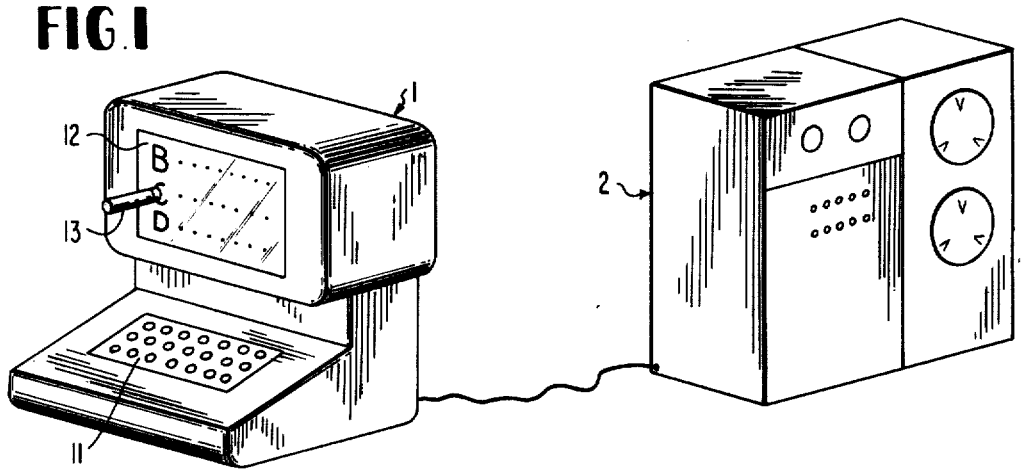
FIG. 1 is a schematic perspective view showing an embodiment of the optical display device in accordance with the present invention connected to a computer.

The system in which the optical display device in accordance with the present invention is used will now be described with reference to FIG. 1, in which reference numeral 1 indicates the optical display device of the invention and 2 indicates a computer connected with the display device 1. In the embodiment shown in FIG. 1, the optical display device 1 is a microreader in which images recorded on a microfilm are projected onto projection screen 12. Reference numeral 11 indicates a key-board for providing an input to select the image to be projected on the screen 12 for display.

For instance, when information concerning contents "A" is desired to be displayed, the operator of the system makes the input a on the keyboard 11. The input signal a is transmitted to the computer 2 for information retrieval treatment thereby. From the computer 2 the output is a coordinate signal, which indicates the coordinate of the microimage on the microfilm containing information A corresponding to the a, or a signal indicating a letter, numeral, figure, etc., that is desired to be displayed. In response to the input of the signal into the display device 1, the microfilm image concerning the information corresponding to a is projected on the screen 12 by the operation of the microfilm retrieval mechanism and the projection optical system directly from the microfilm stored in the display device, or by way of a high brightness CRT for character display built into the display device 1.

In the image projected on the screen 12 concerning information A, titles such as B, C, D . . . and a sentence such as "Point to title with a light pen" are contained, for example. These titles and the sentence may be recorded in advance in the microfilm or may be displayed on the character display CRT by a letter display signal coming from the computer 2 and projected therefrom onto the screen 12.

If the operator of the system points to title C, for instance, among the titles projected on the screen 12, with a light pen 13, the information of C is immediately converted into an electric signal by means as described hereinafter and transmitted to the computer 2. In this case, it is possible to confirm that the input information has been correctly put into the computer 2 by projecting the information put in by the application of the light pen 13 on the screen 12 of the microreader 1. If the information, such as letters, numerals or drawings, projected back on the screen 12 is identical with the content put in by the application of the light pen 13, a signal for starting the information retrieval is sent to the computer 2 from the key board 11. AFter the information is put into the computer 2 by the application of the light pen 13, information retrieval is started to retrieve the information of C and a coordinate signal indicating the coordinate of the microimage carrying the information of C or a signal indicating the letters, numerals or drawings corresponding thereto is put out from the computer 2 and put into the microreader 1. Consequently, a microimage or letters, numerals or drawings concerning C is projected on the screen 12 of the microreader 1.

By repeating the above operation, the micro-reader or the display device in accordance with the present invention can be used as the interface of a man-machine system, whereby it is possible for a man to visually gain information from a computer in a very rapid manner.

Figure 2:
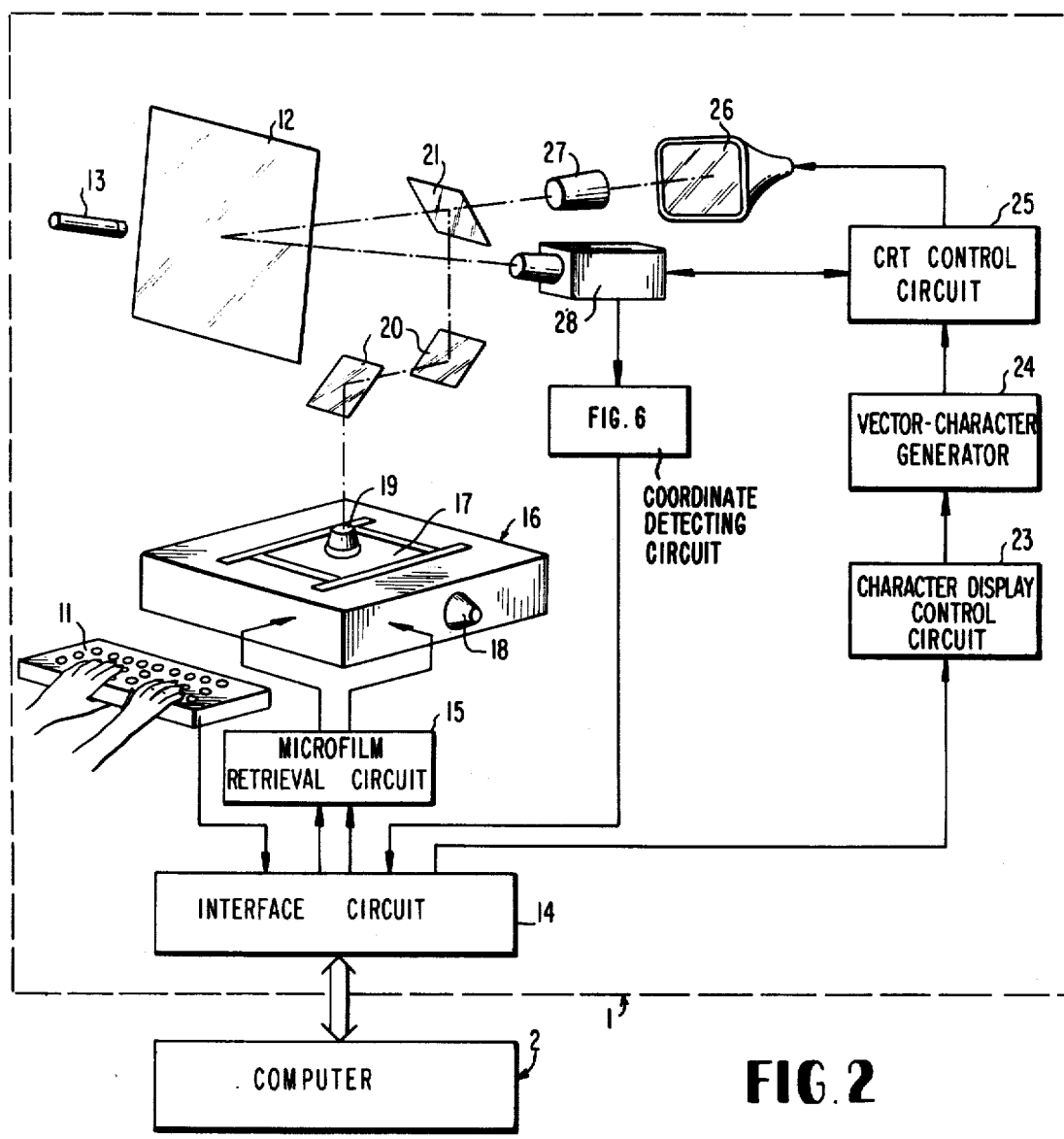
FIG. 2 is a schematically illustrated view with a block diagram showing the internal construction of an optical display device in accordance with the embodiment of this invention shown in FIG. 1.

Referring to FIG. 2 showing a block diagram of a man-machine system employing an optical display device 1 in accordance with the present invention connected with the computer 2, the alphabet or an alphabetical spelling representing the index of the desired information is first keyed in by the keyboard 11 attached to the microreader 1 by the operator of the system. Then, the keyed signal is put into the computor 2 through an interface circuit 14 where the signal is appropriately treated. After an appropriate information retrieval, i.e., appropriate to the model and make of the computer 2 employed, see "Fundamentals of Display Systems," by H. H. Poole, pp. 242-247, Macmillan & Co., Ltd. has been conducted in the computer 2, an electric signal indicating the coordinate of the image in the microfilm or an electric signal indicating the letters, numerals or drawings representing the information desired is put out from the computer 2. When the signal indicating the coordinate of the image in the microfilm is put out from the computer 2 and introduced into the microreader 1, the signal is put into a microfilm retrieval circuit 15, for example as disclosed in Japanese Patent Publication No. 46-8138 after being treated in the interface circuit 14 so as to operate an X-Y movement driving means 16. Then, the desired image in the microfilm 17 is retrieved and brought to the position to be projected via a projection lens system.

The projection lens system can comprise an illumination light source 18, a projection lens 19, a mirror 20 and a half-mirror 21. When the signal indicating letters, numerals or drawings is output from the computer 2 and put into the microreader 1, the signal is put into a character display control circuit 23 for example, as disclosed in "Introduction to the Basic Computer," by Donald Eadie, Prentice-Hall, Inc., Chap. 13, pp. 310–313 after appropriate treatment in the interface circuit 14, and the letters, numerals or drawings are displayed on the high brightness CRT 26 through a vector — character generator 24 and a CRT control circuit 25 for example, as disclosed in Donald Eadie, supra. The letters, numerals and drawings displayed on the high brightness CRT 26 are projected on the screen 12 through a large aperture projection lens 27 and the half-mirror 21. The letters, numerals or drawings are projected through the half-mirror 21 onto the same screen 12 as that on which said microfilm images are projected.

In the present invention, the selective input made by use of a light-pen is conducted on the screen 12 on which the image is optically projected from a microfilm or a CRT by irradiating a light spot thereon with a light-pen.

Figure 3:
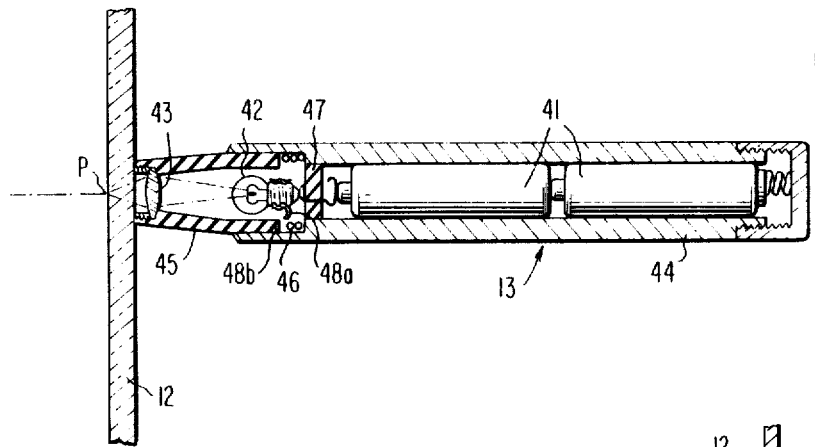
FIG. 3 is a longitudinal sectional view showing an example of a light pen used in connection with the optical display device in accordance with the present invention.

Referring to FIG. 3 showing the internal construction of the light-pen 13, dry cells 41 are retained in a cylindrical metal casing 44 provided with a lamp 42, an insulating portion 47 and a switch contact 48a. The switch contact 48a is fixed to the lamp 42 and connected with the anode of the cells 41, for example. A light-pen head 45 is inserted into the head portion of the metal casing 44 and urged outward by means of a compression spring 46 interposed between the end of the light-pen head 45 and the end of the metal casing 44. The light-pen head 45 is provided with a convex lens 43 and a switch contact 48b to be brought into contact with the switch contact 48a. The lightpen head 45 is pushed inward so that the switch contact 48b can come in contact with the contact 48a to energize the lamp 42. In operation, the light pen 13 is pushed at its head 45 so that the head 45 thereof can be pushed inward (overcoming the spring force of the compression spring 46) and the lamp 42 can be energized and the light therefrom focussed on the screen 12 through the convex lens 43 at a desired point P thereon. The closed circuit between the batteries and the lamp is completed through the metal casing 44 and the closed contacts 48b and 48a. The construction of the switch of the light pen 13 need not be as described above, but can be a switch as is normally employed in an ordinary handlight, etc. Although the light pen 13 described hereinabove is made cordless with dry cells retained therein, it is, of course, possible to provide a cord thereon so that the power may be supplied from the microreader 1. Thus, it becomes possible to focus a light spot on the screen 12 at a desired position by pointing to the position with the light pen 13. It is possible, accordingly, to provide a light spot on any desired part of the optically projected image on the projection screen 12 of the display device or the microreader 1.

Figure 4:
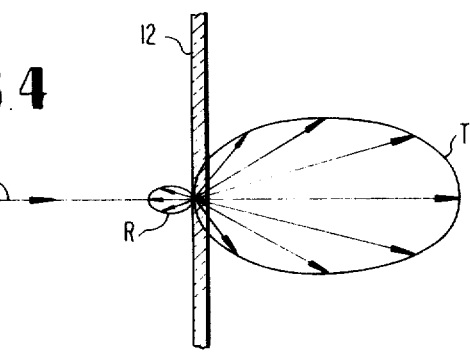
FIG. 4 is an elevational view showing the distribution of light incident to the screen of the optical display device.

The projection screen 12 for example, as disclosed in "Display Systems Engineering," by H. R. Luxenberg, et al, pp. 294–295, 306–307, McGraw-Hill Book Co., (1968) of the microreader 1 in accordance with the present invention has a distribution of light incident thereon as shown in FIG. 4. That is, when incident light I impinges on the screen 12 normally as shown in FIG. 4, the transmission components thereof are distributed as indicated by the distribution characteristic curve T and the reflection components thereof are distributed as indicated by the distribution characteristic curve R. The amount of transmission components is markedly large in comparison with that of the reflection components. Such light distributions are common for general transmission type screens. The ideal transmission type screen is a screen having completely zero reflection components. If the screen 12 is observed from the backside thereof by the use of a television camera 28 connected with a monitor, the light of the light pen 13 transmitted through the projection screen 12 is brightly observed, but the light of the image focussed thereon by means of the projection optical system is scarcely observed. Further, the ambient light around the microreader coming into the display device through the screen is uniformly scattered through the screen, and accordingly, the ambient light is only a uniform, widely spread light when viewed from the television camera 28. This will be well understood in comparison to the case of an unfocused ground glass through which far distances cannot be observed but through which far distances can be clearly observed when it is focussed through a lens system.

Figure 5:
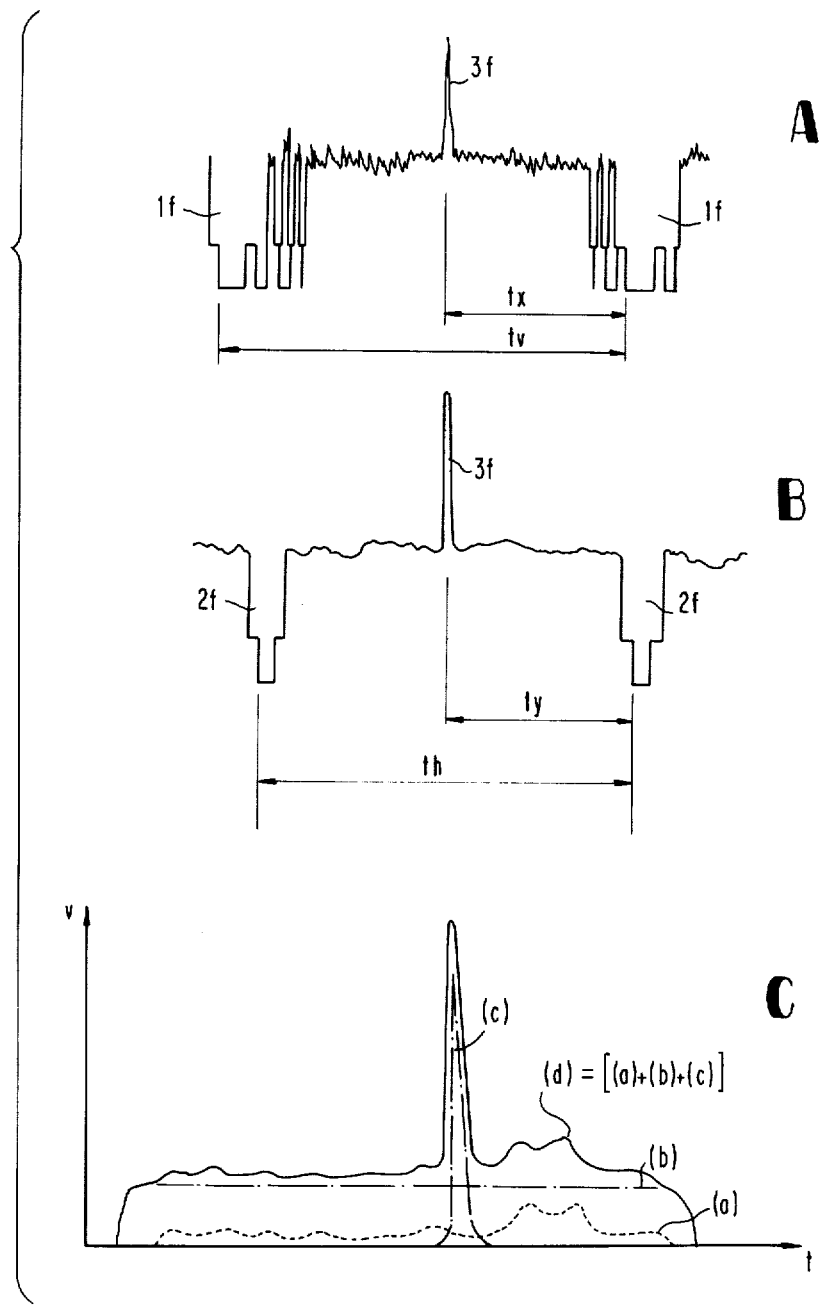
FIGS. 5A, 5B and 5C are graphical representations showing examples of image output signal waves.

An image output signal in the television camera 28 has the a form as shown in FIGS. 5A, 5B and 5C when viewed through an oscilloscope. FIG. 5A shows the form of the signal taken with respect to a comparatively slow time scale where $tv=1/60$ sec and FIG. 5B shows the signal taken with respect to a comparatively fast time scale where $th=1/15750$ sec. In the drawing showing the wave form of the signal, the reference character $1f$ indicates a vertical synchronizing signal, $2f$ indicates a horizontal synchronizing signal and $3f$ indicates an image signal made by the light from the light pen 13. If the wave form shown in FIG. 5B is shown with only the synchronizing signal removed, that is if only the image signal component is present, the wave form becomes similar to true line $(d)$ shown in FIG. 5C. Image signal $(d)$ actually comprises a signal $(a)$ made by the image projected on the screen, a signal $(b)$ made by the ambient light of the microreader and a signal $(c)$ made by the light of the light pen 13 in superposition with said signals.

The signal $(c)$ made by the light pen 13 is markedly large in comparison with the other two signals and much sharper than those signals. A signal to noise ratio of signal $(c)$ and the other two signals of greater than 30 $db$ is preferred. Therefore, if signal $3f$ of the light of the light pen 13 is detected from the image signal by means of a proper electric circuit and the time interval tx between the signal and the vertical synchronizing signal $1f$ and the timing interval $ty$ between the light pen signal $3f$ and the horizontal synchronizing signal $2f$ are calculated, the position of the point indicated by the light pen 13 on the screen 12 viewed from the television camera 28 can be obtained as a coordinate $(tx/tv, ty/th)$.

Figure 6:
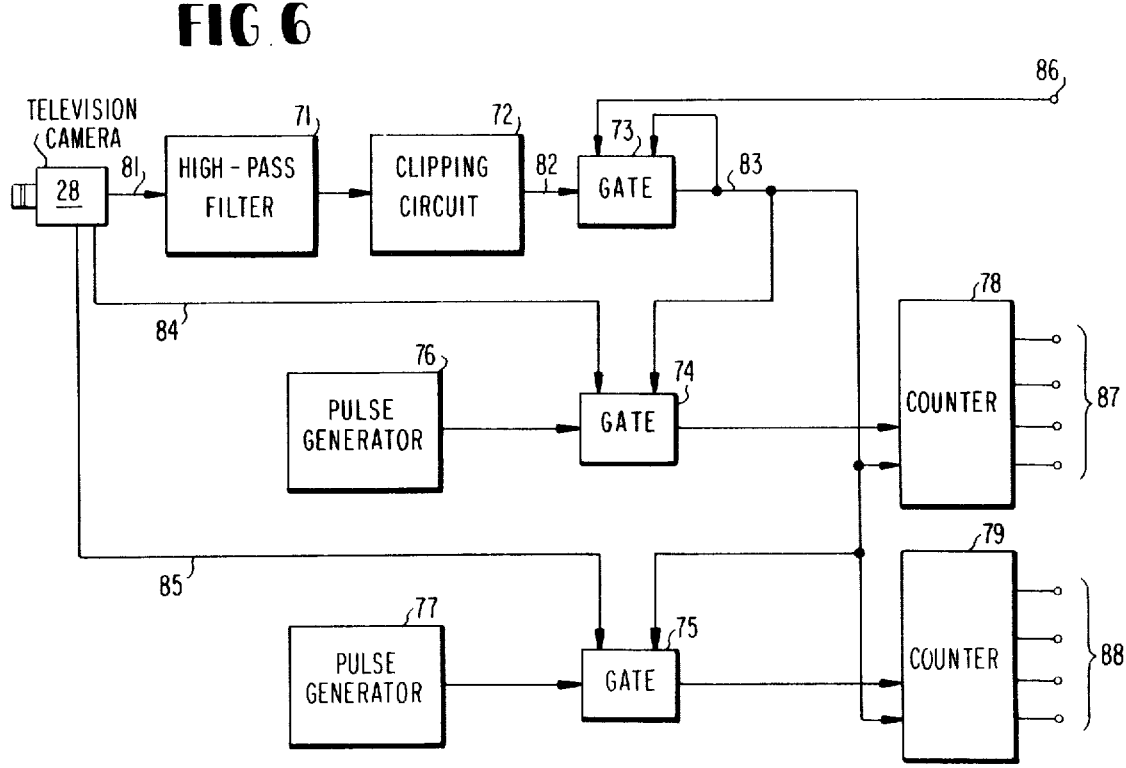
FIG. 6 is a block diagram of a circuit for taking out a signal by the light pen from the image output signal.

Referring to FIG. 6 showing a block diagram of an electric circuit for carrying out the above operation, an image signal 81 comprising three superimposed signals $(a)$, $(b)$ and $(c)$ is put out from the television camera 28 and put into the circuit. First, the signal 81 from the television camera 28 is passed through a high-pass filter 81 where the ambient light signal $(b)$ substantially composed of a direct current component, is eliminated, and then passed through a clipping circuit 72 where the projected image signal $(a)$ which is small is eliminated. Consequently, a pulse signal 82 composed of the signal of the light from the light pen is obtained.

When a start signal is put in from a terminal 86, the gate 73 is opened to let the signal 82 pass through the gate 73. The gate 73 is closed in response to the passage of the signal 82 by the signal 83 itself. The signal 82 becomes signal 83 after passing through the gate 73 and opens the gates 74 and 75 to reset the counters 78 and 79. The gate 74 is connected with a pulse generator 76 generating pulses having a frequency of $2^n/tv$, and while the gate 74 is opened pulses having a frequency of $2^n/tv$ pass through the gate 74 to advance the $n$-bit counter 78. The gate 74 is closed by a vertical synchronizing signal from the television camera 28. When the above operations are completed, the output 87 of the counter 78 indicates the $tx/tv$ value in FIG. 5A as a digital signal P.

Similarly, a pulse generator 77 generating pulses having a frequency of $2^n/th$ is connected with the gate 75 so that pulses having a frequency of $2^n/th$ pass therethrough while the gate 75 is opened and advances the $n$-bit counter 79. The gate 75 is closed by the horizontal synchronizing signal 85 from the television camera 28. After the above operations are completed, the output 88 of the counter 79 indicates the $ty/th$ value in FIG. 5B as a digital signal. The output digital signal value $(p,q)$ of the counters 78 and 79 consequently indicates the position of the light pen 13 immediately after the start signal 86 is put in by rectangular coordinates $(p,q)$. The start signal 86 is given from the keyboard 11 attached to the microreader or a computor 2 connected with the microreader when the information of the light pen is necessary. Further, if the start signal is set and fixed to ON, the position coordinates of the light pen 13 are successively put out from the counters 78 and 79 as the light pen 13 moves. Since the system does not operate unless the light from the light pen occurs conincidentally with a start signal, the position of the light pen where the light pen is pushed on the screen 12 and the light spot is made is put into the device as an output of the device to be transmitted to the computer. If the computer is provided with a program that "When a micro-image of A is projected on the screen and the coordinates $(p,q)$ are pointed to with a light pen, information retrieval of information B is to be conducted.", a man-machine system having a microreader in accordance with this invention is constructed.

Further, in the case of making an input of a part of the information such as letters, numerals and drawings projected from the high brightness CRT 26 by use of a light pen 13, quite the same circuit as that used in case of the micro-image can be used. However, if the picture size of the high brightness CRT 26 and the picture size of the television camera 28 are made equal to each other and the vertical and horizontal deflection signals of both are synchronized, the signal 82 generated by the light of the light pen can be used as an input to be put into the computer. In this case, at the time when signal 82 is taken out, the letters, numerals or drawings pointed to by the light pen are displayed on the CRT by the order from the computer. If the signal 82 is put into the computer through the program which generates a signal for displaying the letters, numerals or drawings on the CRT, the signal at that time makes a display of the letters, numerals or drawings pointed to by the light pen. In accordance with this method, the circuit shown in FIG. 6 can be simplified and the number of the memories of the computer can be lowered. Therefore, the above method can preferably be employed not only when the microimages are displayed but also when the letters, numerals or drawings are displayed and the light pen can be efficiently used.

Further, instead of the television camera 28, a device, such as a Solid State Scanner, trade name produced by the Reticon Corp., can be employed which converts the image made of mechanical scanner solid image taking elements into an electric signal. Particularly when the resolving power of the image put in by means of the light pen is not large, it is possible to use a photoelectric plate in which the photoelectric elements are arranged in the pattern of a matrix so that the element pointed to by the light pen gives the highest output.

While the invention has been described in detail and with reference to specific embodiments thereof, it will be apparent to one skilled in the art that various changes and modifications can be made therein without departing from the spirit and scope thereof.

What is claimed is:

1. An optical display device comprising a screen for optically displaying an image record, means for making a light spot impinge on the screen at a desired position on said image record, means for photoelectrically converting said position of the light spot into an electric control signal which is fed to a computer, and an information retrieval device in which a new image recorded on a film corresponding to said position is projected on the screen under the control of an output signal from the computer.

2. An optical display device as defined in claim 1, wherein said screen is a transmission type projection screen.

3. An optical display device as defined in claim 2, wherein said means for making a light spot impinge on the screen is a light-emitting pen.

4. An optical display device as defined in claim 3, wherein said light-emitting pen is energized to emit light when the head thereof is pressed against the surface of the screen.

5. An optical display device as defined in claim 2, wherein said light spot impinges on the front surface of the screen, and wherein said converting means is located at the backside of the screen so as to receive light transmitted through the screen.

6. An optical display device as defined in claim 1 wherein said converting means comprises photoelectric means for converting said position of the light spot into said control signal, and coordinate detecting circuit means connected to said photoelectric means for converting said control signal into a coordinate signal representing the coordinates of said new image stored on a microfilm and corresponding to said desired position.

7. An optical display device as defined in claim 6, wherein said coordinate detecting circuit means includes a high-pass filter and a clipping circuit.

8. An optical display device as defined in claim 2 wherein both said image record and said new image are projected onto the backside of said screen, whereas said light spot impinges on the front side of said screen.

9. An optical display device as defined in claim 5, wherein said converting means comprises a television camera with a monitor located within the device to view the entire area of the screen from the backside thereof.

10. An optical display device as defined in claim 1, further comprising means for projecting an image on the screen through an optical system.

11. An optical display device as defined in claim 1, wherein said projecting means is a projection lens system for directly focussing an image on the screen from a microfilm.

12. An optical display device as defined in claim 1, wherein said projecting means is a projection lens system for focussing an image on the screen from a display cathode ray tube.

* * * * *